United States Patent
Pyun et al.

(10) Patent No.: US 12,536,940 B2
(45) Date of Patent: Jan. 27, 2026

(54) DISPLAY DEVICE, CONTROLLER AND CURRENT SENSING INTEGRATED CIRCUIT

(71) Applicant: Samsung Display Co., LTD., Yongin-si (KR)

(72) Inventors: Kihyun Pyun, Yongin-si (KR); Jungeon An, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/924,110

(22) Filed: Oct. 23, 2024

(65) Prior Publication Data
US 2025/0140154 A1 May 1, 2025

(30) Foreign Application Priority Data
Nov. 1, 2023 (KR) .......................... 10-2023-0149476

(51) Int. Cl.
*G01R 19/25* (2006.01)
*G09G 3/20* (2006.01)

(52) U.S. Cl.
CPC .......... *G09G 3/2007* (2013.01); *G01R 19/25* (2013.01); *G09G 2330/021* (2013.01); *G09G 2330/028* (2013.01)

(58) Field of Classification Search
CPC .......... G09G 3/2007; G09G 2330/021; G09G 2330/028; G09G 3/20; G09G 3/006; G09G 3/32; G09G 2330/025; G01R 19/25; G01R 19/0092; G01R 19/165; G08B 21/185
See application file for complete search history.

(56) References Cited

U.S. PATENT DOCUMENTS

| | | | | |
|---|---|---|---|---|
| 9,875,693 B2* | 1/2018 | Kwon | ................. | G09G 3/3233 |
| 12,230,212 B2* | 2/2025 | Pyun | ..................... | G09G 3/3258 |
| 12,288,529 B2* | 4/2025 | Pyun | ..................... | G09G 3/3275 |
| 2010/0013867 A1* | 1/2010 | Kim | ...................... | G09G 3/3233 |
| | | | | 313/504 |
| 2014/0084792 A1* | 3/2014 | Oh | ......................... | H05B 47/10 |
| | | | | 315/120 |

(Continued)

FOREIGN PATENT DOCUMENTS

| KR | 100666645 B1 | 1/2007 |
|---|---|---|
| KR | 1020110138722 A | 12/2011 |

(Continued)

*Primary Examiner* — Temesghen Ghebretinsae
*Assistant Examiner* — Karin Kiyabu
(74) *Attorney, Agent, or Firm* — CANTOR COLBURN LLP

(57) ABSTRACT

A display device includes a display panel including a plurality of pixels, a power management circuit which supplies a power supply voltage to the plurality of pixels through a power supply line, a current sensing circuit which generates a digital current code by sensing a panel current flowing through the power supply line, and a controller which determines a peak gray level and a panel load by analyzing input image data, determines a voltage level of the power supply voltage based on the peak gray level and the panel load, and sets a conversion time, during which the panel current is converted into a digital current code, based on the voltage level of the power supply voltage.

20 Claims, 11 Drawing Sheets

(56) References Cited

U.S. PATENT DOCUMENTS

| | | | |
|---|---|---|---|
| 2014/0104258 A1* | 4/2014 | Oh | G09G 3/3233 |
| | | | 345/76 |
| 2019/0293696 A1* | 9/2019 | Guthrie | G01R 19/0038 |
| 2020/0143751 A1* | 5/2020 | Byun | G09G 3/3291 |
| 2022/0215798 A1* | 7/2022 | Pyun | G09G 3/2096 |
| 2023/0325028 A1* | 10/2023 | Uchino | G06F 3/04166 |
| 2025/0191514 A1* | 6/2025 | Pyun | G09G 3/20 |

FOREIGN PATENT DOCUMENTS

| | | | | |
|---|---|---|---|---|
| KR | 1020180059071 A | 6/2018 | | |
| WO | WO-2009037760 A1 * | 3/2009 | | G01R 31/343 |

* cited by examiner

DISPLAY DEVICE, CONTROLLER AND CURRENT SENSING INTEGRATED CIRCUIT

This application claims priority to Korean Patent Application No. 10-2023-0149476, filed on Nov. 1, 2023, and all the benefits accruing therefrom under 35 U.S.C. § 119, the content of which in its entirety is herein incorporated by reference.

BACKGROUND

1. Field

Embodiments of the invention relate to a display device, and more particularly to a controller, a current sensing integrated circuit, and a display device including the controller and the current sensing integrated circuit.

2. Description of the Related Art

To reduce power consumption, or to control a luminance of a display panel, a display device may include a current sensing circuit that senses a current flowing through the display panel, or a panel current. The current sensing circuit may convert the panel current that is an analog signal into a digital current code. In general, a conversion time in which the panel current is converted into the digital current code may be fixed or constant.

SUMMARY

Some embodiments provide a display device that sets a conversion time of a current sensing circuit based on a voltage level of a power supply voltage.

Some embodiments provide a controller that sets a conversion time of a current sensing circuit based on a voltage level of a power supply voltage.

Some embodiments provide a current sensing integrated circuit having a conversion time that is set based on a voltage level of a power supply voltage.

According to embodiments, there is provided a display device including a display panel including a plurality of pixels, a power management circuit which supplies a power supply voltage to the plurality of pixels through a power supply line, a current sensing circuit which generates a digital current code by sensing a panel current flowing through the power supply line, and a controller which determines a peak gray level and a panel load by analyzing input image data, determines a voltage level of the power supply voltage based on the peak gray level and the panel load, and sets a conversion time, during which the panel current is converted into a digital current code, based on the voltage level of the power supply voltage.

In embodiments, the controller may set the conversion time in a way such that the conversion time is decreased as the voltage level of the power supply voltage increases and the conversion time is increased as the voltage level of the power supply voltage decreases.

In embodiments, the display device may further include a rush current detection circuit which generates an alert signal by comparing the digital current code with a rush current code corresponding to a rush reference current.

In embodiments, the controller may control the power management circuit to decrease the voltage level of the power supply voltage in response to the alert signal.

In embodiments, the controller may be implemented as a controller integrated circuit, and the current sensing circuit and the rush current detection circuit may be included in a current sensing integrated circuit which is separated from the controller integrated circuit.

In embodiments, the current sensing integrated circuit may include a conversion time setting register which sets the conversion time, and the controller may set the conversion time by changing a value of the conversion time setting register through inter-integrated circuit (I2C) communication between the controller integrated circuit and the current sensing integrated circuit.

In embodiments, the controller may include a peak gray level determining circuit which determines the peak gray level by analyzing the input image data, a panel load determining circuit which determines the panel load by analyzing the input image data, a power supply voltage determining circuit which determines the voltage level of the power supply voltage based on the peak gray level and the panel load, a conversion time determining circuit which determines the conversion time based on the voltage level of the power supply voltage, and a power supply voltage control circuit which provides a voltage code corresponding to the voltage level of the power supply voltage to the power management circuit.

In embodiments, the peak gray level determining circuit may determine a maximum gray level among a plurality of gray levels represented by the input image data for the plurality of pixels as the peak gray level.

In embodiments, the panel load determining circuit may calculate the panel load by dividing a sum of a plurality of gray levels represented by the input image data for the plurality of pixels by a maximum gray level sum.

In embodiments, the power supply voltage determining circuit may increase the voltage level of the power supply voltage as the peak gray level increases, and may increase the voltage level of the power supply voltage as the panel load increases.

In embodiments, the conversion time determining circuit may decrease the conversion time as the voltage level of the power supply voltage increases, and may increase the conversion time as the voltage level of the power supply voltage decreases.

In embodiments, the controller may further include a power supply voltage-conversion time lookup table which stores the conversion time corresponding to the voltage level of the power supply voltage, and the conversion time determining circuit may determine the conversion time corresponding to the voltage level of the power supply voltage using the power supply voltage-conversion time lookup table.

In embodiments, the power supply voltage control circuit may decrease the voltage code provided to the power management circuit to decrease the voltage level of the power supply voltage in response to an alert signal from a rush current detection circuit.

In embodiments, the controller may include a global current management circuit which receives the digital current code from the current sensing circuit, determines a target current code corresponding to the panel load, and controls the panel current by comparing the digital current code and the target current code.

In embodiments, the controller may include an overcurrent protection circuit which receives the digital current code from the current sensing circuit, compares the digital current code with a reference overcurrent code, and controls the power management circuit to stop supplying the power supply voltage when the digital current code is higher than the reference overcurrent code.

According to embodiments, a controller of a display device includes a peak gray level determining circuit which determines a peak gray level by analyzing input image data, a panel load determining circuit which determines a panel load for a display panel of the display device by analyzing the input image data, a power supply voltage determining circuit which determines a voltage level of a power supply voltage supplied to a plurality of pixels of the display device based on the peak gray level and the panel load, a conversion time determining circuit which determines a conversion time, during which a panel current is converted into a digital current code, corresponding to the voltage level of the power supply voltage, and to provide the conversion time to a current sensing circuit which senses the panel current, and a power supply voltage control circuit which provides a voltage code corresponding to the voltage level of the power supply voltage to a power management circuit.

In embodiments, the conversion time determining circuit may decrease the conversion time as the voltage level of the power supply voltage increases, and may increase the conversion time as the voltage level of the power supply voltage decreases.

In embodiments, the controller may be implemented as a controller integrated circuit, the current sensing circuit may be included in a current sensing integrated circuit which is separated from the controller integrated circuit, and the conversion time determining circuit may provide the conversion time to the current sensing circuit through I2C communication between the controller integrated circuit and the current sensing integrated circuit.

In embodiments, the controller may receive the digital current code from the current sensing circuit through the I2C communication. In such embodiments, the controller may further include a global current management circuit which determines a target current code corresponding to the panel load, and controls the panel current by comparing the digital current code and the target current code, and an overcurrent protection circuit which compares the digital current code with a reference overcurrent code, and controls the power management circuit to stop supplying the power supply voltage when the digital current code is higher than the reference overcurrent code.

According to embodiments, a current sensing integrated circuit of a display device includes a conversion time setting register which stores a conversion time, a current sensing circuit which converts a panel current of the display device into a digital current code during the conversion time, and a rush current detection circuit which generates an alert signal by comparing the digital current code with a rush current code corresponding to a rush reference current. In such embodiments, the conversion time of the conversion time setting register is set based on a voltage level of a power supply voltage supplied to a plurality of pixels of the display device.

As described above, in embodiments of a display device, a controller and a current sensing integrated circuit, a voltage level of a power supply voltage may be determined based on a peak gray level and a panel load, and a conversion time, during which a panel current is converted into a display current code, may be set based on the voltage level of the power supply voltage. Accordingly, a rush current may be rapidly detected, or the accuracy of a current sensing operation may be improved.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
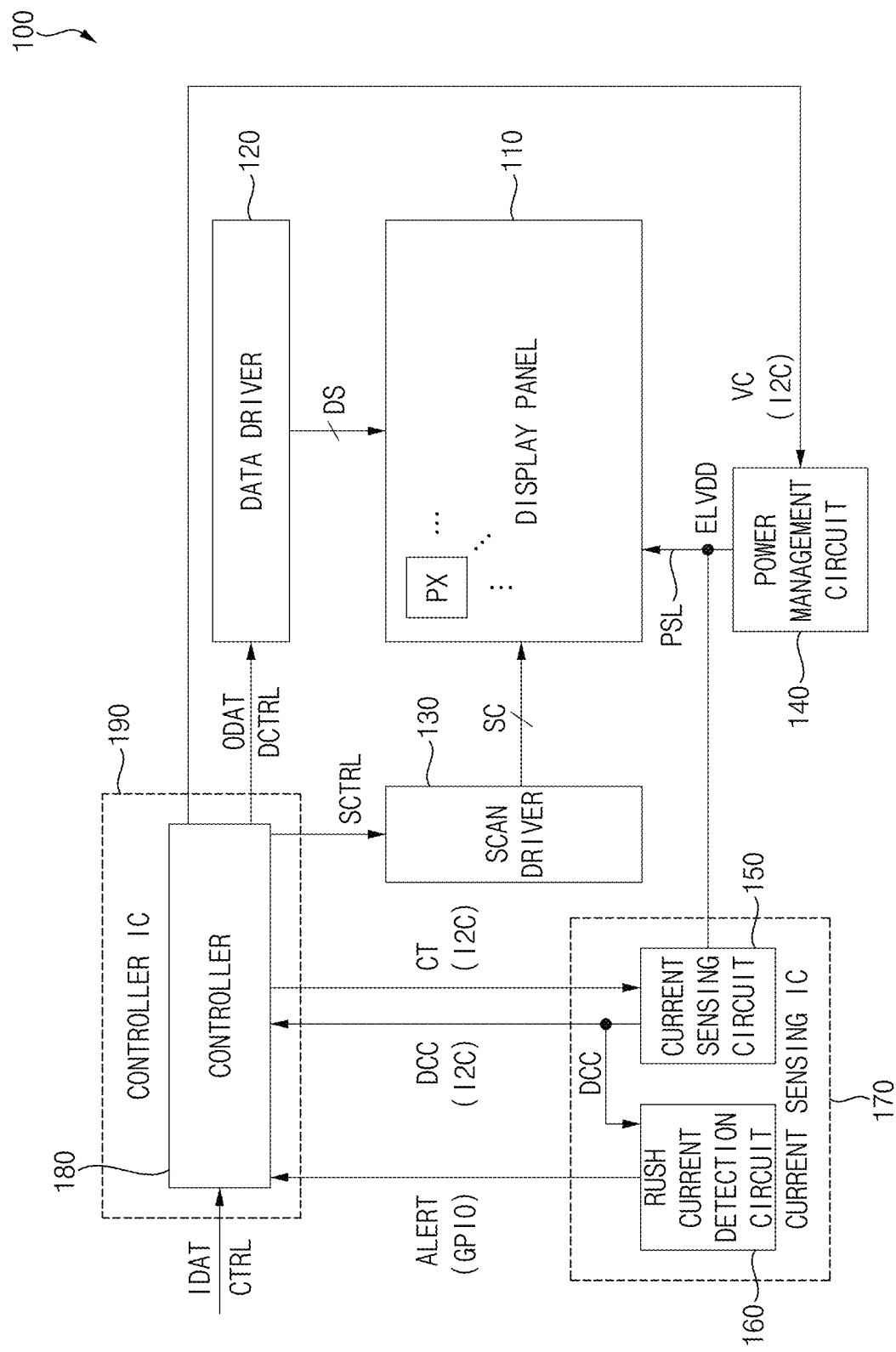
FIG. 1 is a block diagram illustrating a display device according to embodiments.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be explained in detail with reference to the accompanying drawings.

Figure 2:
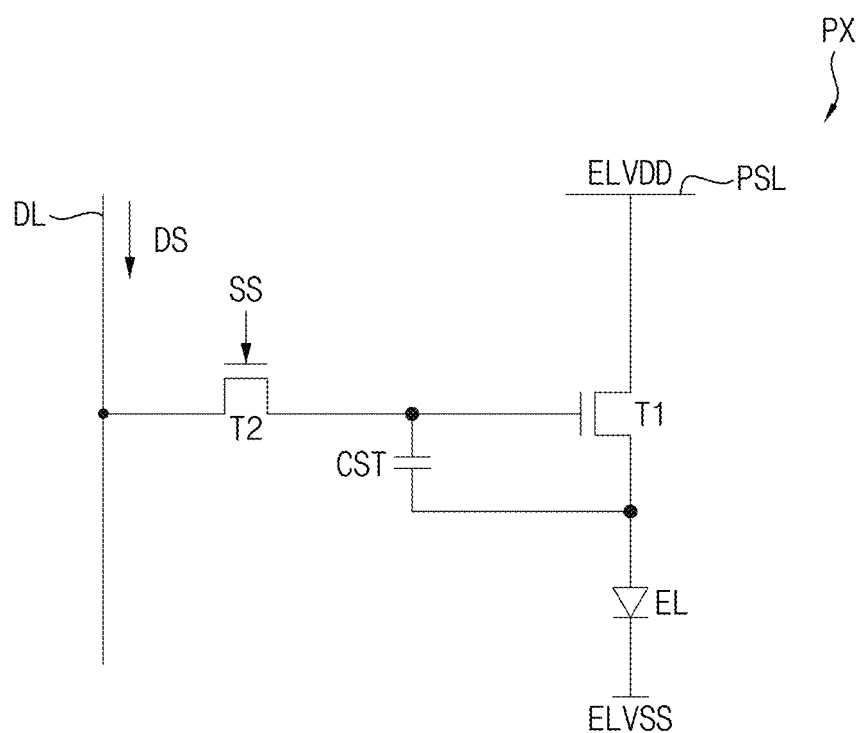
FIG. 2 is a circuit diagram illustrating an example of a pixel included in a display device according to embodiments.
Figure 3:
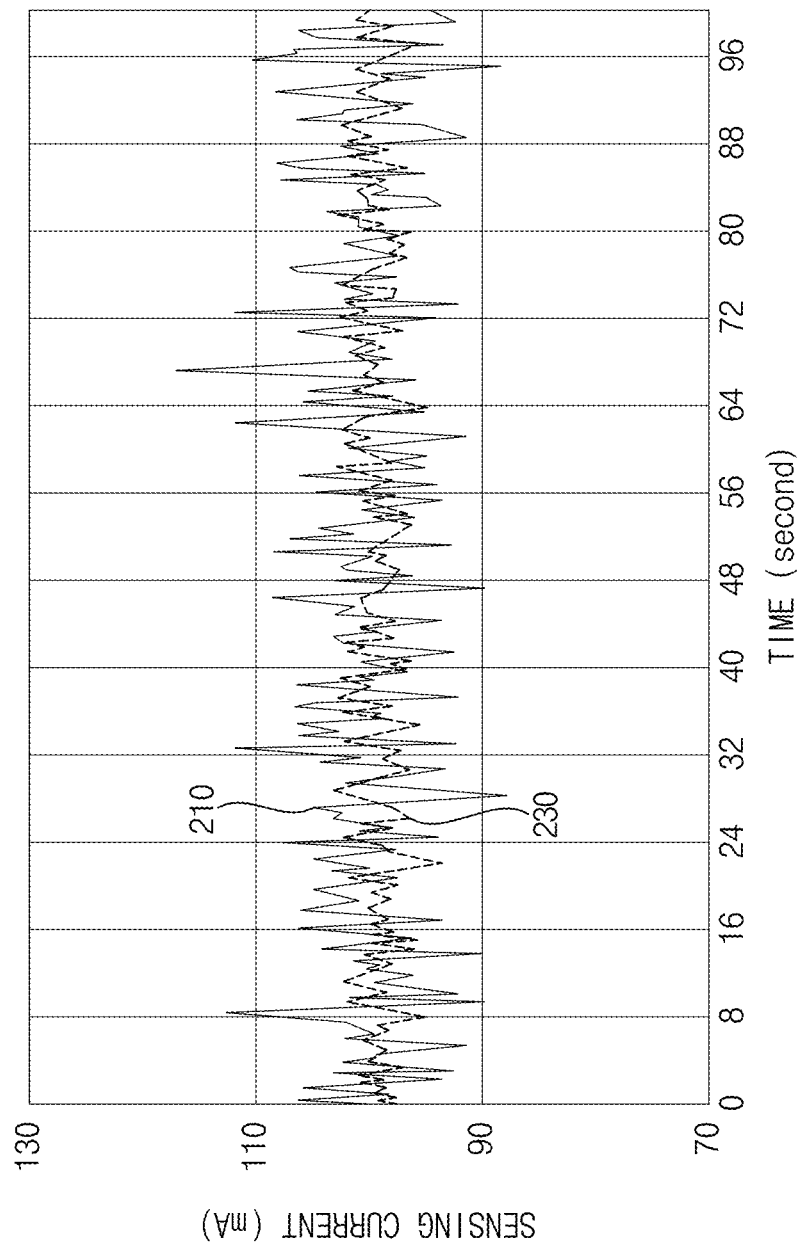
FIG. 3 is a diagram illustrating examples of sensing currents represented by digital current codes in cases where a current sensing circuit has different conversion times.
Figure 4:
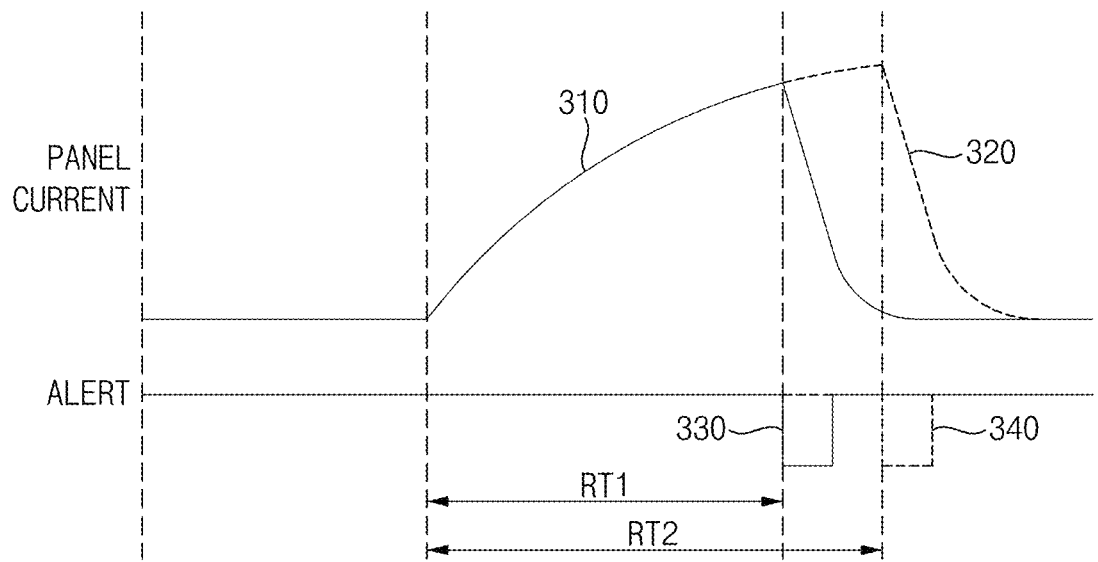
FIG. 4 is a diagram illustrating examples of response times of a rush current detection circuit in cases where a current sensing circuit has different conversion times.
Figure 5:
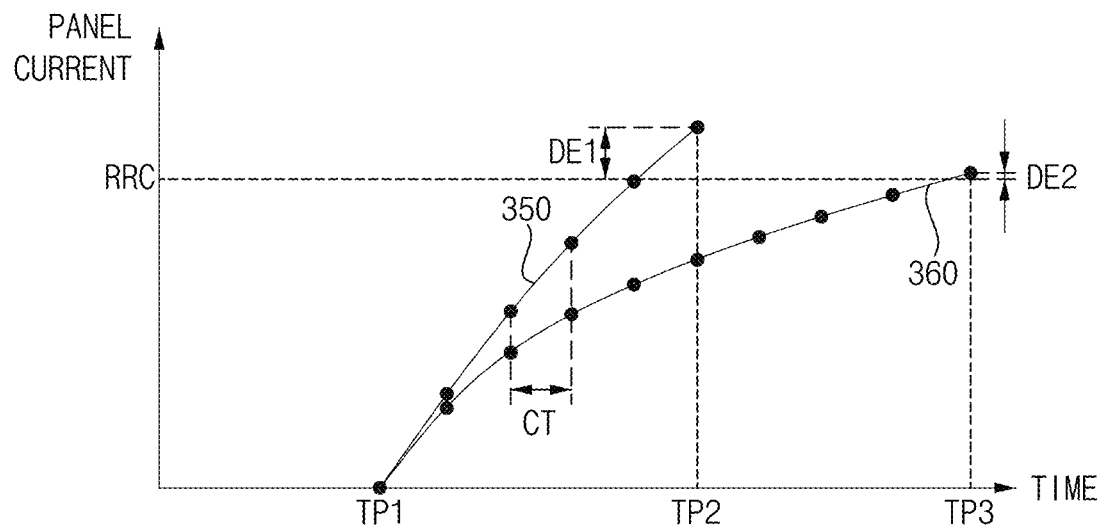
FIG. 5 is a diagram for describing examples of rush current detection errors in cases where a current sensing circuit has substantially the same conversion time with respect to different voltage levels of a power supply voltage.
Figure 6:
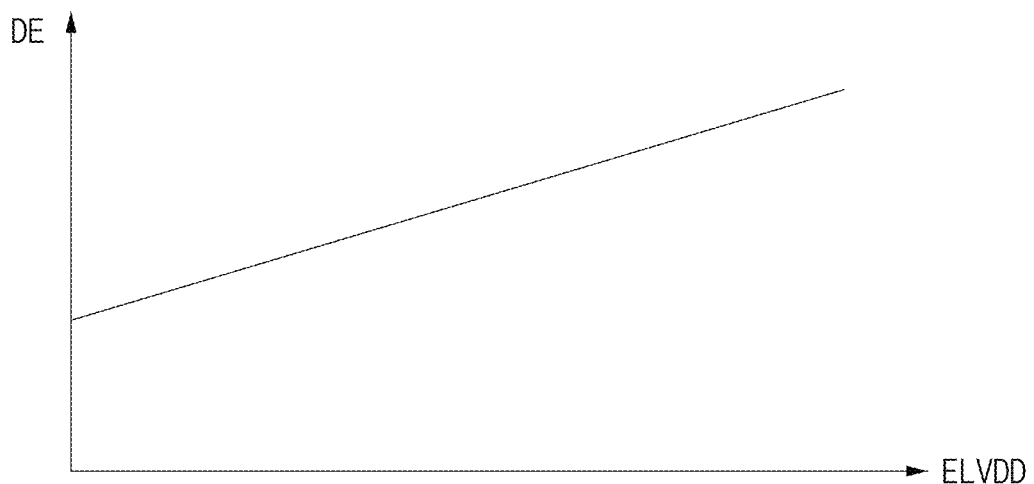
FIG. 6 is a diagram illustrating an example of a rush current detection error versus a voltage level of a power supply voltage.
Figure 7:
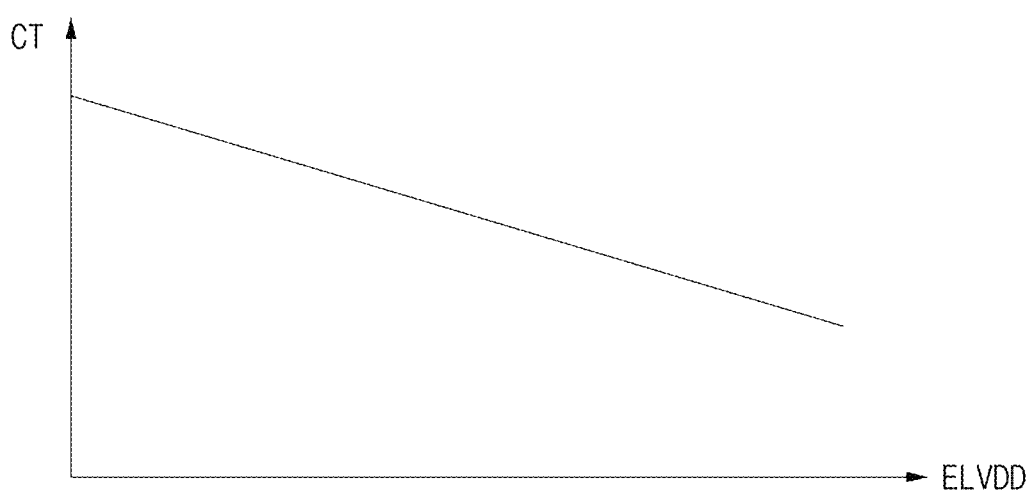
FIG. 7 is a diagram illustrating an example of a conversion time versus a voltage level of a power supply voltage in a display device according to embodiments.
Figure 8:
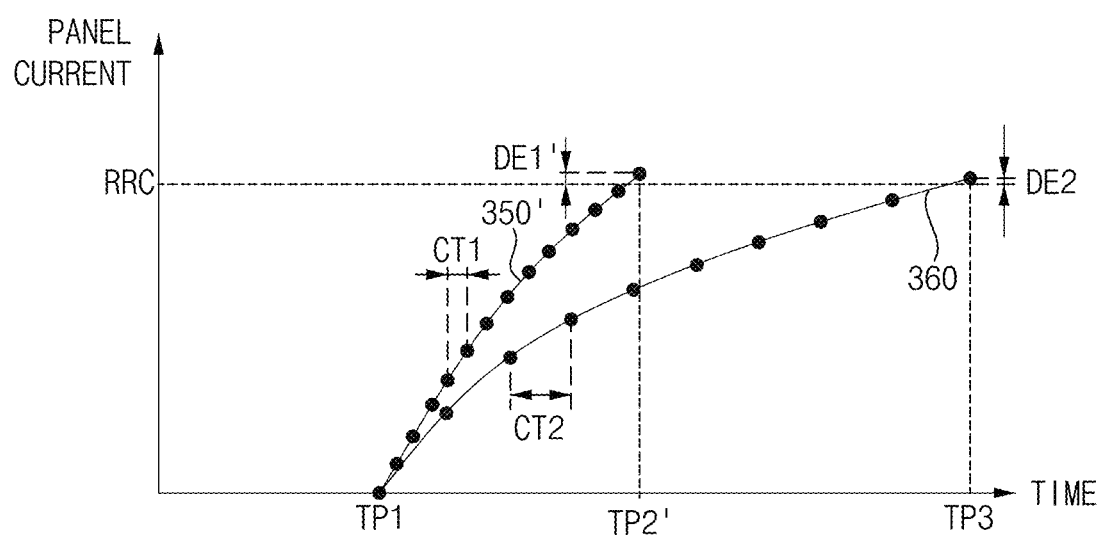
FIG. 8 is a diagram for describing examples of rush current detection errors in a display device according to embodiments.

FIG. 1 is a block diagram illustrating a display device according to embodiments, FIG. 2 is a circuit diagram illustrating an example of a pixel included in a display device according to embodiments, FIG. 3 is a diagram illustrating examples of sensing currents represented by digital current codes in cases where a current sensing circuit has different conversion times, FIG. 4 is a diagram illustrating examples of response times of a rush current detection circuit in cases where a current sensing circuit has different conversion times, FIG. 5 is a diagram for describing examples of rush current detection errors in cases where a current sensing circuit has substantially the same conversion time with respect to different voltage levels of a power supply voltage, FIG. 6 is a diagram illustrating an example of a rush current detection error versus a voltage level of a power supply voltage, FIG. 7 is a diagram illustrating an example of a conversion time versus a voltage level of a power supply voltage in a display device according to embodiments, and FIG. 8 is a diagram for describing examples of rush current detection errors in a display device according to embodiments.

Referring to FIG. 1, a display device 100 according to embodiments may include a display panel 110 that includes a plurality of pixels PX, a power management circuit 140 that supplies a first power supply voltage ELVDD (e.g., a high power supply voltage) to the plurality of pixels PX through a power supply line PSL, a current sensing circuit 150 that senses a panel current flowing through the power supply line PSL, and a controller 180 that controls an operation of the display device 100. In some embodiments, the display device 100 may further include a data driver 120 that provides data signals DS to the plurality of pixels PX, a scan driver 130 that provides scan signals SC to the plurality of pixels PX, and a rush current detection circuit 160 that detects a rush current occurred in the display panel 110.

The display panel 110 may include a plurality of data lines, a plurality of scan lines, and the plurality of pixels PX coupled to the plurality of data lines and the plurality of scan lines. In some embodiments, as illustrated in FIG. 2, each pixel PX may include a first transistor T1, a second transistor T2, a storage capacitor CST and a light emitting element EL.

The storage capacitor CST may store a data signal DS transferred through the data line DL and the second transistor T2. In some embodiments, the storage capacitor CST may include a first electrode connected to a gate of the first transistor T1, and a second electrode connected to a node between the first transistor T1 and the light emitting element EL.

The first transistor T1 may generate a driving current based on the data signal DS stored in the storage capacitor CST. In some embodiments, the first transistor T1 may include a gate connected to the first electrode of the storage capacitor CST, a first terminal connected to the power supply line PSL that transfers the first power supply voltage ELVDD, and a second terminal connected to the second electrode of the storage capacitor CST and the light emitting element EL.

The second transistor T2 may transfer the data signal DS of the data line DL to the first electrode of the storage capacitor CST in response to a scan signal SC. In some embodiments, the second transistor T2 may include a gate that receives the scan signal SC, a first terminal connected to the data line DL, and a second terminal connected to the first electrode of the storage capacitor CST.

The light emitting element EL may emit light based on the driving current generated by the first transistor T1. In an embodiment, for example, the light emitting element EL may be an organic light emitting diode (OLED), but is not limited thereto. In other embodiments, for example, the light emitting element EL may be a nano light emitting diode (NED), a quantum dot (QD) light emitting diode, a micro light emitting diode, an inorganic light emitting diode, or any other suitable light emitting element. In some embodiments, the light emitting element EL may include an anode connected to the second terminal of the first transistor T1 and the second electrode of the storage capacitor CST, and a cathode connected to a line that transfers a second power supply voltage ELVSS (e.g., a low power supply voltage).

Although FIG. 2 illustrates an embodiment of the pixel PX including two transistors and one capacitor, the pixel PX of the display device 100 according to embodiments is not limited to the example of FIG. 2. In other embodiments, the pixel PX may include three or more transistors and/or two or more capacitors.

Referring back to FIG. 1, the data driver 120 may generate the data signals DS based on output image data ODAT and a data control signal DCTRL received from the controller 180, and may provide the data signals DS to the plurality of pixels PX through the plurality of data lines. In some embodiments, the data control signal DCTRL may include, but not limited to, an output data enable signal, a horizontal start signal and a load signal. In some embodiments, the controller 180 may be implemented as (or defined by) a controller integrated circuit (IC) 190 as illustrated in FIG. 1, and the data driver 120 may be implemented as a data driver IC different from the controller IC 190. In other embodiments, the data driver 120 and the controller 180 may be implemented as a single IC, and the single IC may be referred to as a timing controller embedded data driver (TED) IC.

The scan driver 130 may generate the scan signals SC based on a scan control signal SCTRL received from the controller 180, and may sequentially provide the scan signals SC to the plurality of pixels PX on a row-by-row basis through the plurality of scan lines. In some embodiments, the scan control signal SCTRL may include, but not limited to, a scan start signal and a scan clock signal. In some embodiments, the scan driver 130 may be integrated or formed in the display panel 110. In other embodiments, the scan driver 130 may be implemented as one or more scan driver ICs.

The power management circuit 140 may supply the first power supply voltage ELVDD to the plurality of pixels PX through the power supply line PSL. In some embodiments, the power management circuit 140 may further generate the second power supply voltage ELVSS supplied to the plurality of pixels PX, an analog power supply voltage supplied to the data driver 120, high and low gate voltages supplied to the scan driver 130, etc. In some embodiments, the power management circuit 140 may receive a voltage code VC representing a voltage level of the first power supply voltage ELVDD from the controller 180, and may generate the first power supply voltage ELVDD having the voltage level corresponding to the voltage code VC. Further, in some embodiments, the power management circuit 140 may be implemented as a power management integrated circuit (PMIC), and may receive the voltage code VC from the controller 180 through an inter-integrated circuit (I2C) communication between the controller IC 190 and the PMIC, but is not limited thereto. In other embodiments, the power management circuit 140 may be included in controller 180.

The current sensing circuit 150 may generate a digital current code DCC by sensing the panel current flowing through the power supply line PSL that transfers the first power supply voltage ELVDD. Here, the panel current may be a current flowing through the power supply line PSL, and may correspond to a sum of the driving currents provided to the light emitting elements EL of the plurality of pixels PX of the display panel 110. Further, the current sensing circuit 150 may convert the panel current into the digital current code DCC during a conversion time CT that is set by the controller 180. Here, the conversion time CT in which the panel current is converted into the digital current code DCC may include a sampling time for sampling a sensing voltage corresponding to the panel current, and an analog-to-digital conversion (ADC) time for analog-to-digital converting the sampled sensing voltage into the digital current code DCC.

The rush current detection circuit 160 may generate an alert signal ALERT by detecting the rush current occurred in the display panel 110, and may provide the alert signal ALERT to the controller 180. Here, the rush current may be a current of the display panel 110 greater than a rush reference current that excessively increases power consumption of the display device 100. In an embodiment, when the rush current is detected, the display device 100 may decrease the first power supply voltage ELVDD (e.g., to a predetermined voltage level) to reduce the current of the display panel 110 and the power consumption of the display device 100. In some embodiments, the rush current detection circuit 160 may compare the digital current code DCC generated by the current sensing circuit 150 with a rush current code corresponding to the rush reference current, and may provide the alert signal ALERT to the controller 180 when the digital current code DCC is greater than or equal to the rush current code. The controller 180 may control the power management circuit 140 to decrease the voltage level of the first power supply voltage ELVDD (e.g., to the predetermined voltage level) in response to the alert signal ALERT.

In some embodiments, as illustrated in FIG. 1, the current sensing circuit 150 and the rush current detection circuit 160 may be included or formed in a current sensing IC 170 that is different from the controller IC 190 of the controller 180. In some embodiments, the current sensing circuit 150 may receive the conversion time CT from the controller 180 through I2C communication between the controller IC 190 and the current sensing IC 170, and may transfer the digital current code DCC to the controller 180 through the I2C communication. In such an embodiment, where the rush current detection circuit 160 is formed in the current sensing IC 170 different from the controller IC 190, a rush current detection operation of the rush current detection circuit 160 may be rapidly performed. In some embodiments, the rush current detection circuit 160 may transfer the alert signal ALERT to the controller 180 through, but not limited to, general purpose input output (GPIO) communication.

The controller 180 (e.g., a timing controller (TCON)) may receive input image data IDAT and a control signal CTRL from an external host processor (e.g., an application processor (AP), a graphics processing unit (GPU) or a graphics card). In some embodiments, the input image data IDAT may be RGB image data including red image data, green image data and blue image data. Further, in some embodiments, the control signal CTRL may include, but not limited to, a vertical synchronization signal, a horizontal synchronization signal, an input data enable signal, a master clock signal, etc. The controller 180 may generate the data control signal DCTRL, the scan control signal SCTRL and the output image data ODAT based on the control signal CTRL and the input image data IDAT. The controller 180 may control an operation of the data driver 120 by providing the data control signal DCTRL and the output image data ODAT to the data driver 120, and may control an operation of the scan driver 130 by providing the scan control signal SCTRL to the scan driver 130.

In the display device 100 according to embodiments, the controller 180 may determine a peak gray level and a panel load by analyzing the input image data IDAT, and may determine the voltage level of the first power supply voltage ELVDD based on the peak gray level and the panel load. In some embodiments, the controller 180 may determine the maximum gray level among a plurality of gray levels represented by the input image data IDAT for the plurality of pixels PX as the peak gray level, and may calculate the panel load by dividing a sum of the plurality of gray levels for the plurality of pixels PX by a maximum gray level sum (e.g., a sum of 255-gray levels). In an embodiment, as described below with reference to FIG. 10, the controller 180 may increase the voltage level of the first power supply voltage ELVDD as the peak gray level increases, and may increase the voltage level of the first power supply voltage ELVDD as the panel load increases. Since the voltage level of the first power supply voltage ELVDD is adjusted based on the peak gray level and the panel load, the power consumption of the display device 100 may be reduced while an image quality of the display device 100 is not deteriorated.

Further, in the display device 100 according to embodiments, the controller 180 may set the conversion time CT of the current sensing circuit 150 based on the voltage level of the first power supply voltage ELVDD. As the conversion time CT increases, a ripple of the sensing current represented by the digital current code DCC may be reduced. FIG. 3 illustrates, in a case where the panel current of about 100 milliamperes (mA) flows through the power supply line PSL, the sensing current 210 represented by the digital current code DCC generated by the current sensing circuit 150 with the conversion time CT of about 100 microseconds (μs), and the sensing current 230 represented by the digital current code DCC generated by the current sensing circuit 150 with the conversion time CT of about 200 μs. As illustrated in FIG. 3, when the current sensing circuit 150 has the conversion time CT of about 100 μs, the sensing current 210 represented by the digital current code DCC may fluctuate in a variation range of about 38 mA. However, when the conversion time CT is increased from about 100 μs to about 200 μs, the variation range of the sensing current 230 represented by the digital current code DCC may be reduced from about 38 mA to about 20 mA, and the ripple of the sensing current 230 may be reduced. Thus, when the conversion time CT of the current sensing circuit 150 is increased, the ripple of the sensing current represented by the digital current code DCC may be reduced, and the accuracy of a current sensing operation of the current sensing circuit 150 may be improved.

However, when the conversion time CT of the current sensing circuit 150 is increased, the rush current detection operation of the rush current detection circuit 160 may be delayed, and the power consumption of the display device 100 may be increased. FIG. 4 illustrates a panel current 310, a pulse 330 of the alert signal ALERT and a response time RT1 of the rush current detection circuit 160 in a case where the conversion time CT is about 80 μs, and also illustrates a panel current 320, a pulse 340 of the alert signal ALERT and a response time RT2 of the rush current detection circuit 160 in a case where the conversion time CT is about 320 μs. For example, as illustrated in FIG. 4, when the conversion time CT is about 80 μs, the response time RT1 of the rush current detection circuit 160 may be about 1.7 ms. However, when the conversion time CT is about 320 μs, the response time RT2 of the rush current detection circuit 160 may be about 1.94 ms. That is, as the conversion time CT increases, the response time RT1 and RT2 of the rush current detection circuit 160 may be increased, the panel current 310 and 320 may be increased, and the power consumption of the display device 100 may be increased.

Further, the power consumption of the display device 100 caused by the increase of the conversion time CT may be further increased when the first power supply voltage ELVDD has a high voltage level, e.g., a voltage level higher than a predetermined voltage. FIG. 5 illustrates, in cases where the current sensing circuit 150 has substantially the same conversion time CT and the panel load is increased at a first time point TP, the panel current 350 when the first power supply voltage ELVDD is about 27 V, and the panel current 360 when the first power supply voltage ELVDD is about 22 V. Further, in FIG. 5, points on the panel currents 350 and 360 may indicate time points at which the rush current detection operation is performed. As illustrated in FIG. 5, when the first power supply voltage ELVDD is about 22 volts (V), the panel current 360 may be relatively slowly increased, a rush current detection error DE2 corresponding to a difference between the rush reference current RRC and the panel current 360 at a third time point TP3 at which the rush current greater than the rush reference current RRC is detected may be relatively small. However, when the first power supply voltage ELVDD is about 27 V, the panel current 350 may be relatively rapidly increased, and a rush current detection error DE1 corresponding to a difference between the rush reference current RRC and the panel current 350 at a second time point TP2 at which the rush current greater than the rush reference current RRC is detected be relatively large. That is, as illustrated in FIG. 6, as the voltage level of the first power supply voltage ELVDD is increased, the rush current detection error DE corresponding to the difference between the rush reference current RRC and the panel current 350 and 360 may be increased. That is, when the first power supply voltage ELVDD has the high voltage level, the rush current is detected after the panel current 360 becomes the rush current having a large difference with respect to the rush reference current RRC, and thus the power consumption of the display device 100 may be increased.

In the display device 100 according to embodiments, as illustrated in FIG. 7, the controller 180 may set the conversion time CT of the current sensing circuit 150 in a way such that the conversion time CT of the current sensing circuit 150 is decreased as the voltage level of the first power supply voltage ELVDD increases, and is increased as the voltage level of the first power supply voltage ELVDD decreases. In some embodiments, as described below with reference to FIG. 12, the current sensing IC 170 may include a conversion time setting register 155 that sets the conversion time CT, and the controller 180 may set the conversion time CT of the current sensing circuit 150 by changing a value of the conversion time setting register 155 through the I2C communication between the controller IC 190 and the current sensing IC 170. Although FIG. 7 illustrates an embodiment in which the conversion time CT is decreased in a linear proportion to an increase of the voltage level of the first power supply voltage ELVDD, in other embodiments, the conversion time CT may be decreased in a non-linear proportion to the increase of the voltage level of the first power supply voltage ELVDD.

As described above, in the display device 100 according to embodiments, the conversion time CT of the current sensing circuit 150 is decreased as the voltage level of the first power supply voltage ELVDD increases in the case where the first power supply voltage ELVDD has the high voltage level, such that the rush current detection operation of the rush current detection circuit 160 may be rapidly performed, the rush current detection error DE1 illustrated in FIG. 5 may be reduced, and the power consumption of the display device 100 may be reduced. FIG. 8 illustrates the panel current 350' of the display device 100 according to embodiments when the first power supply voltage ELVDD is about 27 V, and the panel current 360 of the display device 100 according to embodiments when the first power supply voltage ELVDD is about 22 V. As illustrated in FIG. 8, the conversion time CT1 of the current sensing circuit 150 when the first power supply voltage ELVDD is about 27 V may be shorter than the conversion time CT2 of the current sensing circuit 150 when the first power supply voltage ELVDD is about 22 V. Accordingly, in the case where the first power supply voltage ELVDD is about 27 V, even if the panel current 350' is rapidly increased, the rush current detection error DE1' corresponding to the difference between the reference current RRC and the panel current 350' at the second time point TP2' at which the rush current greater than the rush reference current RRC is detected may be reduced compared with the rush current detection error DE1 illustrated in FIG. 5. That is, in the case where the first power supply voltage ELVDD has the high voltage level, the conversion time CT of the current sensing circuit 150 may be decreased, the rush current detection operation may be rapidly performed to reduce the rush current detection error DE1', and the power consumption of the display device 100 may be reduced.

Further, in the display device 100 according to embodiments, since the conversion time CT of the current sensing circuit 150 is increased as the voltage level of the first power supply voltage ELVDD decreases, in the case where the first power supply voltage ELVDD has a low voltage level, i.e., a voltage lower than the predetermined voltage, as described above with reference to FIG. 3, the ripple of the sensing current represented by the digital current code DCC generated by the current sensing circuit 150 may be reduced, and the accuracy of the current sensing operation of the current sensing circuit 150 may be improved.

As described above, in the display device 100 according to embodiments, the voltage level of the first power supply voltage ELVDD may be determined based on the peak gray level and the panel load, and the conversion time CT of the current sensing circuit 150 may be set based on the voltage level of the first power supply voltage ELVDD. Accordingly, in the case where the first power supply voltage ELVDD has the relatively high voltage level, the conversion time CT of the current sensing circuit 150 may be decreased, the rush current detection operation may be rapidly performed, and the power consumption of the display device 100 may be reduced. Further, in the case where the first power supply voltage ELVDD has the relatively low voltage level, the conversion time CT of the current sensing circuit 150 may be increased, and the accuracy of the current sensing operation of the current sensing circuit 150 may be improved.

Figure 9:
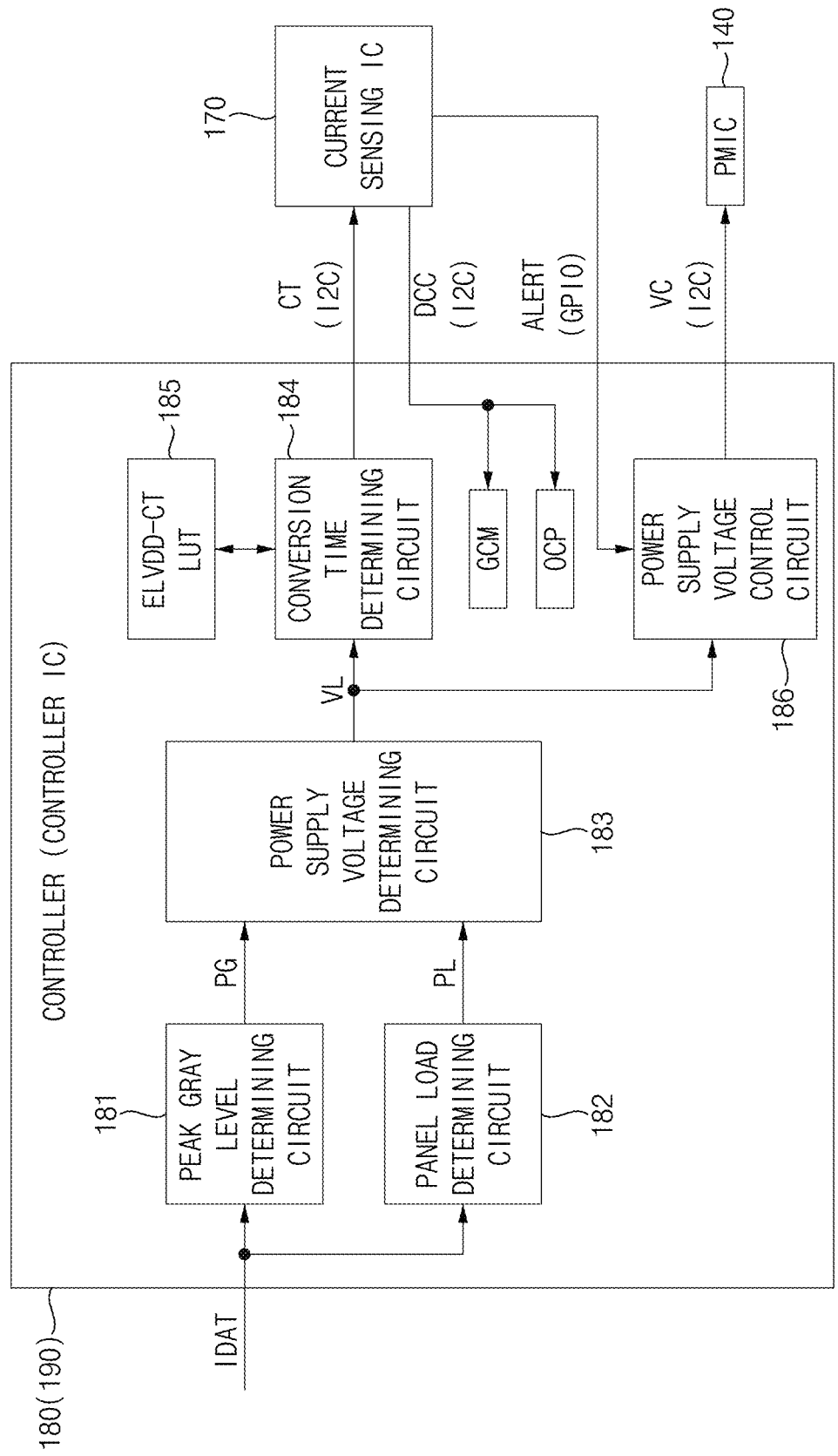
FIG. 9 is a block diagram illustrating a controller according to embodiments.
Figure 10:
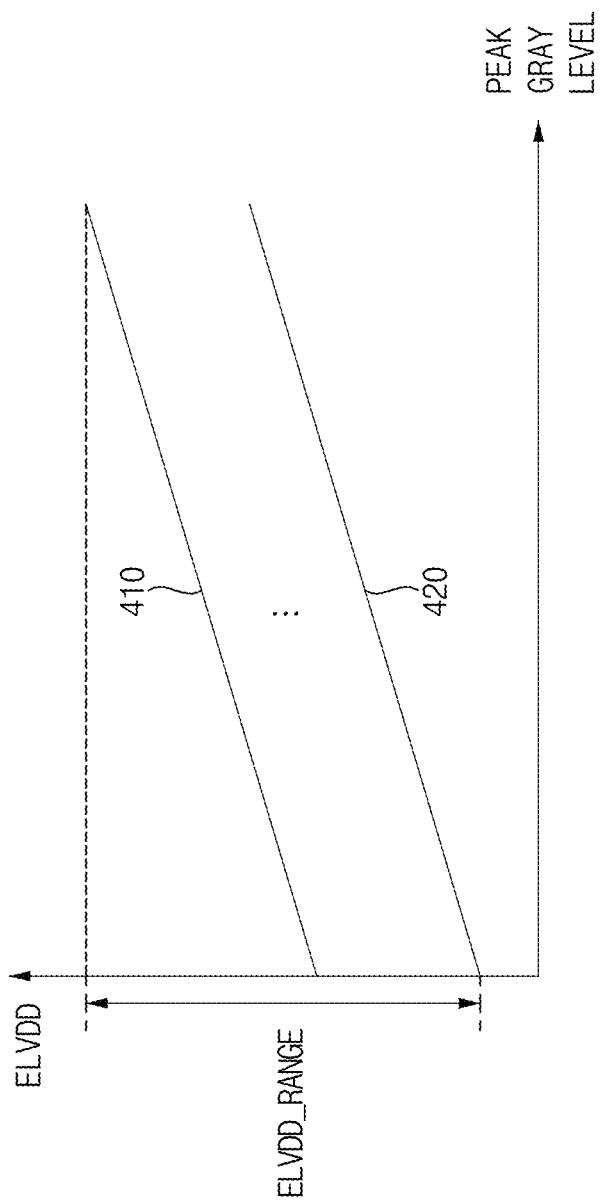
FIG. 10 is a diagram for describing an example of a voltage level of a power supply voltage determined by a power supply voltage determining circuit.
Figure 11:
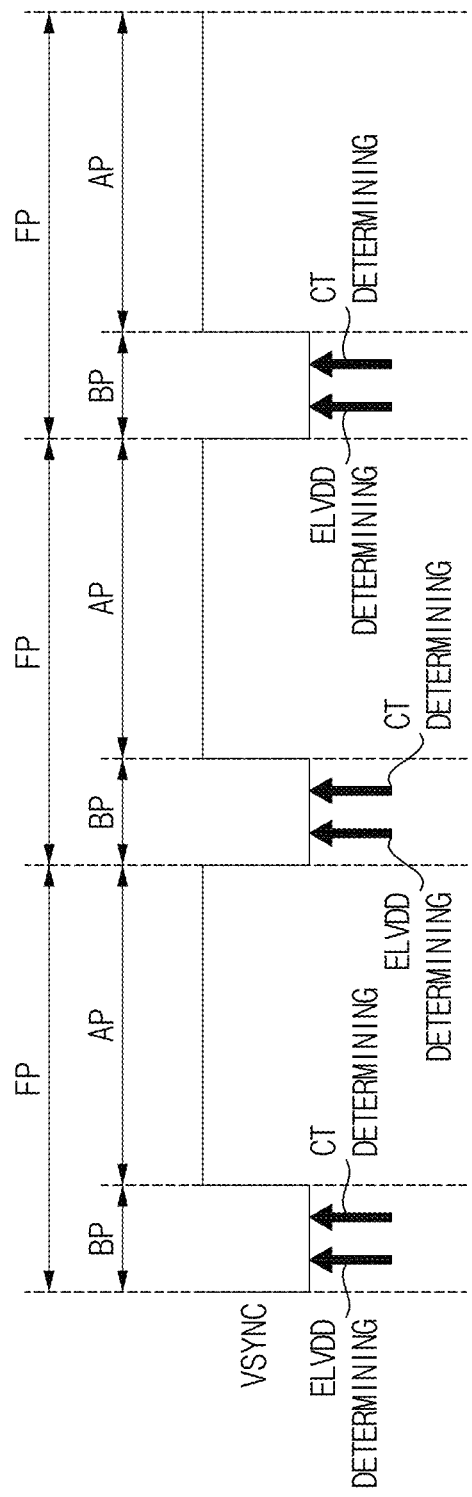
FIG. 11 is a timing diagram for describing an example of timings of a power supply voltage determining operation and a conversion time determining operation.

FIG. 9 is a block diagram illustrating a controller according to embodiments, FIG. 10 is a diagram for describing an example of a voltage level of a power supply voltage determined by a power supply voltage determining circuit, and FIG. 11 is a timing diagram for describing an example of timings of a power supply voltage determining operation and a conversion time determining operation.

Referring to FIG. 9, a controller 180 according to embodiments may include a peak gray level determining circuit 181, a panel load determining circuit 182, a power supply voltage determining circuit 183, a conversion time determining circuit 184 and a power supply voltage control circuit 186. In some embodiments, the controller 180 may further include a power supply voltage-conversion time lookup table (ELVDD-CT LUT) 185, a global current management circuit GCM and an overcurrent protection circuit OCP. Further, in some embodiments, the controller 180 may be implemented as a controller IC 190 different (or separated) from a current sensing IC 170 and a PMIC.

The peak gray level determining circuit 181 may determine a peak gray level PG by analyzing input image data IDAT. In some embodiments, the peak gray level determining circuit 181 may determine the maximum gray level among a plurality of gray levels represented by the input image data IDAT for a plurality of pixels as the peak gray level PG. For example, when the input image data IDAT represent 10 through 100-gray levels in one frame, the peak gray level determining circuit 181 may determine the 100-gray level that is the maximum gray level as the peak gray level PG.

The panel load determining circuit 182 may determine a panel load PL by analyzing the input image data IDAT. In some embodiments, the panel load determining circuit 182 may calculate the panel load PL by dividing a sum of the plurality of gray levels represented by the input image data IDAT for the plurality of pixels by a maximum gray level sum (for example, a sum of 255-gray levels). In a case, for example, where the input image data IDAT represent the 255-gray levels with respect to all pixels, the panel load determining circuit 182 may determine the panel load PL as 1 (or 100%). In another case, for example, where the input image data IDAT represent the 100-gray levels for all pixels, the panel load determining circuit 182 may determine the panel load PL as about 0.39 (or about 39%). In another case, for example, where the input image data IDAT represent 0-gray levels for all pixels, the panel load determining circuit 182 may determine the panel load PL as 0 (or 0%).

The power supply voltage determining circuit 183 may determine a voltage level VL of a power supply voltage ELVDD (or a first power supply voltage ELVDD illustrated in FIG. 2) based on the peak gray level PG and the panel load PL. In some embodiments, the power supply voltage determining circuit 183 may increase the voltage level VL of the power supply voltage ELVDD as the peak gray level PG increases, and may increase the voltage level VL of the power supply voltage ELVDD as the panel load PL increases. FIG. 10 illustrates a first graph 410 of the power supply voltage ELVDD versus the peak gray level PG when the panel load PL is a maximum load (e.g., 1 or 100%), and a second graph 420 of the power supply voltage ELVDD versus the peak gray level PG when the panel load PL is a minimum load (e.g., 0 or 0%). At the same panel load PL, as the peak gray level PG increases from a minimum gray level (e.g., the 0-gray level) to a maximum gray level (e.g., the 255-gray level), the voltage level VL of the power supply voltage ELVDD may be gradually increased as in each of the first graph 410 and the second graph 420. Further, at the same peak gray level PG, as the panel load PL increases from the minimum load to the maximum load, the voltage level VL of the power supply voltage ELVDD may be increased from a point of the second graph 420 to a point of the first graph 410. That is, as each of the peak gray level PG and the panel load PL increases, the power supply voltage may be increased within a power supply voltage range ELVDD RANGE from a minimum voltage level corresponding to the minimum gray level and the minimum load to a maximum voltage level corresponding to the maximum gray level and the maximum load.

The power supply voltage determining circuit 183 may provide the voltage level VL of the power supply voltage ELVDD determined based on the peak gray level PG and the panel load PL to the power supply voltage control circuit 186. The power supply voltage control circuit 186 may provide a power management circuit 140 with a voltage code VC corresponding to the voltage level VL of the power supply voltage ELVDD determined by the power supply voltage determining circuit 183. In some embodiments, the power management circuit 140 may be implemented as the PMIC, and the power supply voltage control circuit 186 may provide the voltage code VC to the power management circuit 140 through I2C communication between the controller IC 190 and the PMIC, but is not limited thereto. In some embodiments, the power supply voltage determining circuit 183 may provide the conversion time determining circuit 184 with the voltage level VL of the power supply voltage ELVDD determined based on the peak gray level PG and the panel load PL.

The conversion time determining circuit 184 may determine a conversion time CT during which a panel current is converted into a digital current code DCC based on the voltage level VL of the power supply voltage ELVDD. In an embodiment, for example, the conversion time determining circuit 184 may decrease the conversion time CT as the voltage level VL of the power supply voltage ELVDD increases, and may increase the conversion time CT as the voltage level VL of the power supply voltage ELVDD decreases. Thus, a rush current detection operation may be rapidly performed when the voltage level VL of the power supply voltage ELVDD is relatively high, and the accuracy of a current sensing operation may be improved when the voltage level VL of the power supply voltage ELVDD is relatively low. In some embodiments, the controller 180 may further include the ELVDD-CT LUT 185 that stores the conversion time CT corresponding to the voltage level VL of the power supply voltage ELVDD, and the conversion time determining circuit 184 may determine the conversion time CT corresponding to the voltage level VL of the power supply voltage ELVDD using the ELVDD-CT LUT 185.

The conversion time determining circuit 184 may provide the current sensing IC 170 with the conversion time CT determined based on the voltage level VL of the power supply voltage ELVDD. In some embodiments, the conversion time determining circuit 184 may transfer the conversion time CT to the current sensing IC 170 through I2C communication between the controller IC 190 and the current sensing IC 170, but is not limited thereto. The current sensing IC 170 may convert the panel current into the digital current code DCC during the conversion time CT set by the conversion time determining circuit 184, and may transfer the digital current code DCC representing the sensing current to the controller IC 190 through the I2C communication.

The controller IC 190 may include the global current management circuit GCM that receives the digital current code DCC. The global current management circuit GCM may determine a target current code representing a target current based on the panel load PL, and may compare the digital current code DCC representing the sensing current with the target current code representing the target current. The global current management circuit GCM may adjust the input image data IDAT based on the comparison result between the digital current code DCC and the target current code. In an embodiment, for example, when the digital current code DCC is higher than the target current code, the global current management circuit GCM may decrease the plurality of gray levels represented by the input image data IDAT. Accordingly, when the panel current increases as a temperature of a display panel increases, the global current management circuit GCM may decrease the panel current by adjusting the input image data IDAT, thereby effectively preventing an increase in luminance caused by an increase in temperature of the display panel.

The controller IC 190 may include the overcurrent protection circuit OCP that receives the digital current code DCC. The overcurrent protection circuit OCP may compare the digital current code DCC representing the sensing current with a reference overcurrent code representing a reference overcurrent. When the digital current code DCC is higher than the reference overcurrent code, the overcurrent protection circuit OCP may control the power management circuit 140 to stop supplying the power supply voltage ELVDD. Accordingly, when overcurrent occurs in a display device, the supply of the power supply voltage ELVDD may be stopped, thereby effectively preventing damage to the display device.

In some embodiments, an operation that determines the power supply voltage ELVDD by the power supply voltage determining circuit 183 and an operation that determines the conversion time CT by the conversion time determining circuit 184 may be performed in each frame period. For example, as illustrated in FIG. 11, each frame period FP defined by a vertical synchronization signal VSYNC may include a blank period BP in which data signals are not provided to a plurality of pixels and an active period AP in which the data signals are provided to the plurality of pixels, the operation that determines the power supply voltage ELVDD and the operation that determines the conversion time CT may be sequentially performed in the blank period BP of each frame period FP.

Further, in some embodiments, the current sensing IC 170 may generate an alert signal ALERT by detecting a rush current of the display panel, and may provide the alert signal ALERT to the controller IC 190. In some embodiments, the current sensing IC 170 (e.g., the rush current detection circuit 160) may transfer the alert signal ALERT to the controller IC 190 through GPIO communication, but is not limited thereto. In response to the alert signal ALERT, the power supply voltage control circuit 186 may decrease the voltage code VC provided to the power management circuit 140 (e.g., to a predetermined voltage code representing a predetermined voltage level) to decrease the voltage level of the power supply voltage ELVDD. The power management circuit 140 may decrease the voltage level of the power supply voltage ELVDD in response to the decreased voltage code VC, and may supply the power supply voltage ELVDD having the decreased voltage level to the display panel. Accordingly, the panel current of the display panel may be decreased, and the power consumption of the display device may be reduced.

Figure 12:
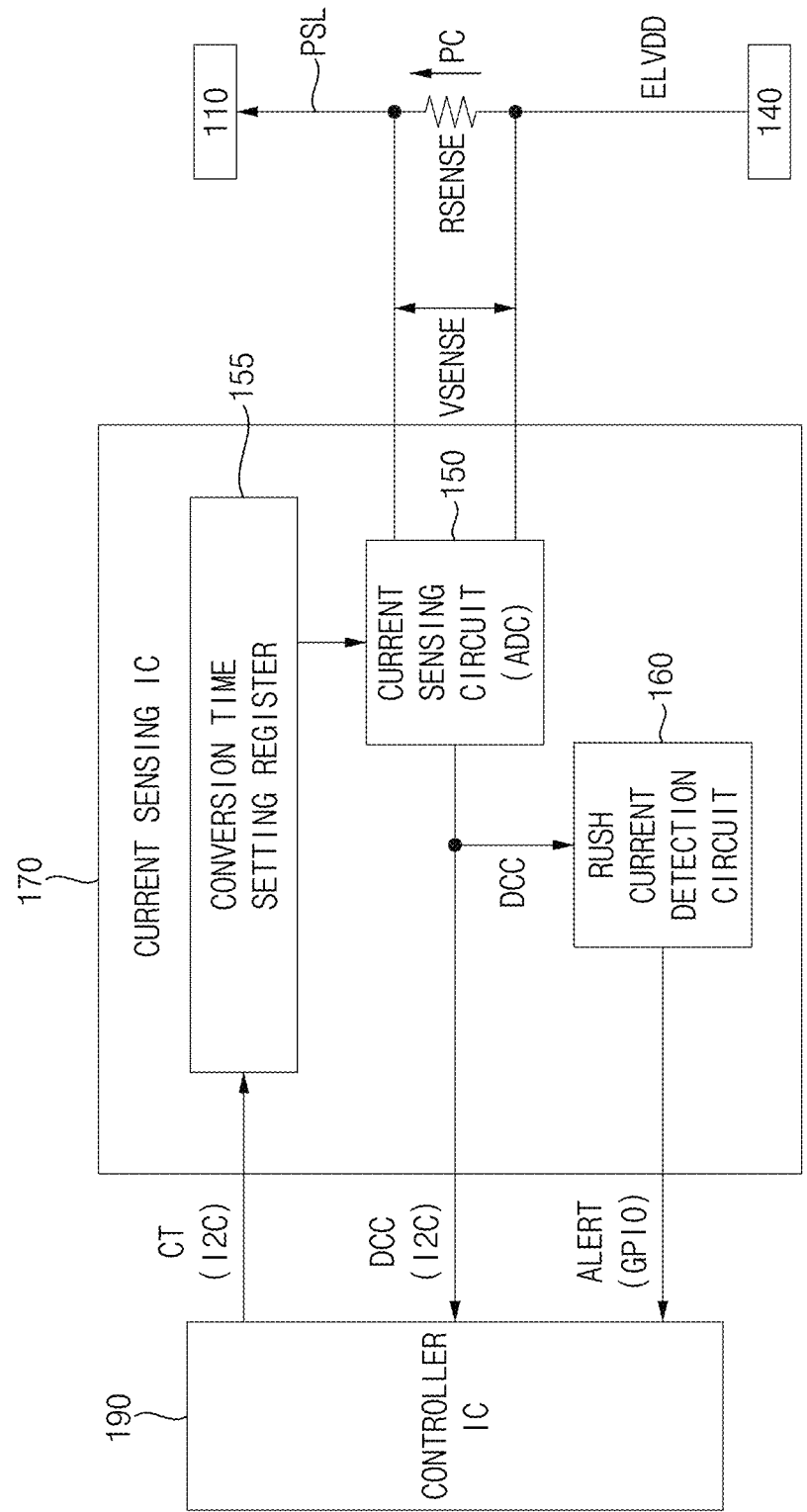
FIG. 12 is a block diagram illustrating a current sensing integrated circuit according to embodiments.

FIG. 12 is a block diagram illustrating a current sensing IC according to embodiments.

Referring to FIG. 12, an embodiment of a current sensing IC 170 may include a conversion time setting register 155, a current sensing circuit 150 and a rush current detection circuit 160.

The conversion time setting register 155 may store a conversion time CT during which a panel current PC of a display panel 110 is converted into a digital current code DCC. The controller IC 190 may determine the conversion time CT of the current sensing circuit 150 based on a voltage level of a power supply voltage ELVDD supplied to a plurality of pixels of the display panel 110, and may set the conversion time CT of the current sensing circuit 150 by changing a value of the conversion time setting register 155 through I2C communication.

The current sensing circuit 150 may convert the panel current PC flowing through a power supply line PSL that transfers the power supply voltage ELVDD into the digital current code DCC during the conversion time CT stored in the conversion time setting register 155. In some embodiments, the current sensing circuit 150 may perform a sampling operation that samples a sensing voltage VSENSE between both opposing ends of a sensing resistor RSENSE connected in the power supply line PSL. Since the panel current PC flows through the sensing resistor RSENSE, the sensing voltage VSENSE across the sensing resistor RSENSE may correspond to the panel current PC of the display panel 110. Further, the current sensing circuit 150 may perform an analog-to-digital conversion (ADC) operation on the sampled sensing voltage VSENSE to generate the digital current code DCC representing a sensing current. Thus, the conversion time CT during which the panel current PC is converted into the digital current code DCC may include a time of the sampling operation that samples the sensing voltage VSENSE corresponding to the panel current PC, and a time of the ADC operation for the sampled sensing voltage VSENSE. Further, in some embodiments, the conversion time CT may include times of one or more sampling operations and times of one or more ADC operations. The current sensing circuit 150 may provide the digital current code DCC to the rush current detection circuit 160, and may transfer the digital current code DCC to the controller IC 190 through the I2C communication.

The rush current detection circuit 160 may generate an alert signal ALERT by comparing the digital current code DCC representing the sensing current, or the panel current PC, with a rush current code corresponding to a rush reference current. When the panel current PC is greater than the rush reference current, or when the digital current code DCC is greater than the rush current code, the rush current detection circuit 160 may provide the alert signal ALERT to the controller IC 190. The controller IC 190 may control a power management circuit 140 to decrease the voltage level of the power supply voltage ELVDD (e.g., to a predetermined voltage level) in response to the alert signal ALERT. Accordingly, the panel current PC of the display panel 110 may be decreased, and the power consumption of the display device may be reduced.

Figure 13:
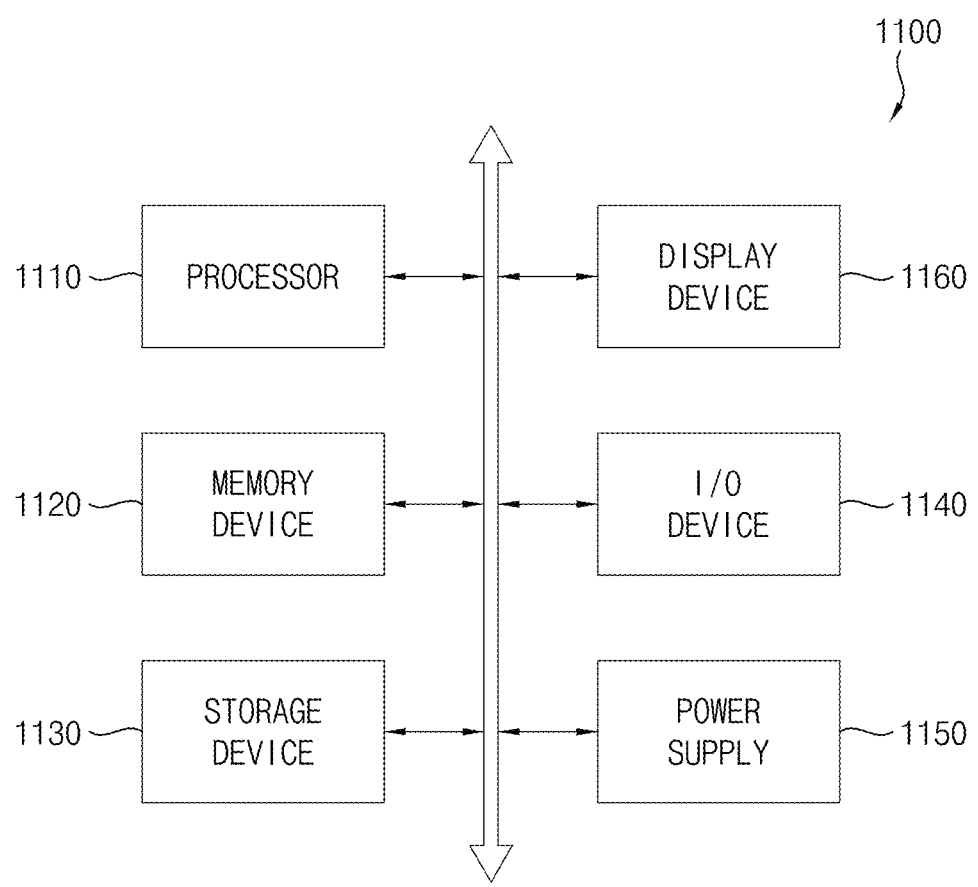
FIG. 13 is a block diagram illustrating an electronic device including a display device according to embodiments.

FIG. 13 is a block diagram illustrating an electronic device including a display device according to embodiments.

Referring to FIG. 13, an embodiment of an electronic device 1100 may include a processor 1110, a memory device 1120, a storage device 1130, an input/output (I/O) device 1140, a power supply 1150 and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro processor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, a voltage level of a power supply voltage may be determined based on a peak gray level and a panel load, and a conversion time during which a panel current is converted into a display current code may be set according to the voltage level of the power supply voltage. In some embodiments, the conversion time may be decreased as the voltage level of the power supply voltage increases, and may be increased as the voltage level of the power supply voltage decreases. Accordingly, a rush current detection operation may be rapidly performed when the power supply voltage has a relatively high voltage level, and the accuracy of a current sensing operation may be improved when the power supply voltage has a relatively low voltage level.

Embodiments of the invention may be applied any electronic device 1100 including the display device 1160, for example, a mobile phone, a smart phone, a tablet computer, a virtual reality (VR) device, a television (TV) (e.g., a digital TV, a three-dimensional (3D) TV, etc.), a wearable electronic device, a personal computer (PC), a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An electronic device comprising:
   a processor configured to provide input image data; and
   a display device configured to receive the input image data from the processor, and to display an image based on the input image data, the display device comprising:
   a display panel including a plurality of pixels;
   a power management circuit which supplies a power supply voltage to the plurality of pixels through a power supply line;

a current sensing circuit which generates a digital current code by sensing a panel current flowing through the power supply line; and a controller which determines a peak gray level and a panel load by analyzing the input image data, determines a voltage level of the power supply voltage based on the peak gray level and the panel load, and sets a conversion time duration, during which the panel current is converted into the digital current code, based on the voltage level of the power supply voltage.

2. The electronic device of claim 1, wherein the controller sets the conversion time duration in a way such that the conversion time duration is decreased as the voltage level of the power supply voltage increases and the conversion time duration is increased as the voltage level of the power supply voltage decreases.

3. The electronic display device of claim 1, further comprising:

a rush current detection circuit which generates an alert signal by comparing the digital current code with a rush current code corresponding to a rush reference current.

4. The electronic device of claim 3, wherein the controller controls the power management circuit to decrease the voltage level of the power supply voltage in response to the alert signal.

5. The electronic device of claim 3, wherein the controller is implemented as a controller integrated circuit, and wherein the current sensing circuit and the rush current detection circuit are included in a current sensing integrated circuit which is separated from the controller integrated circuit.

6. The electronic device of claim 5, wherein the current sensing integrated circuit includes a conversion time setting register which sets the conversion time duration, and wherein the controller sets the conversion time duration by changing a value of the conversion time setting register through inter-integrated circuit communication between the controller integrated circuit and the current sensing integrated circuit.

7. The electronic device of claim 1, wherein the controller includes:

a peak gray level determining circuit which determines the peak gray level by analyzing the input image data;

a panel load determining circuit which determines the panel load by analyzing the input image data;

a power supply voltage determining circuit which determines the voltage level of the power supply voltage based on the peak gray level and the panel load;

a conversion time determining circuit which determines the conversion time duration based on the voltage level of the power supply voltage; and a power supply voltage control circuit which provides a voltage code corresponding to the voltage level of the power supply voltage to the power management circuit.

8. The electronic device of claim 7, wherein the peak gray level determining circuit determines a maximum gray level among a plurality of gray levels represented by the input image data for the plurality of pixels as the peak gray level.

9. The electronic device of claim 7, wherein the panel load determining circuit calculates the panel load by dividing a sum of a plurality of gray levels represented by the input image data for the plurality of pixels by a maximum gray level sum.

10. The electronic device of claim 7, wherein the power supply voltage determining circuit increases the voltage level of the power supply voltage as the peak gray level increases, and increases the voltage level of the power supply voltage as the panel load increases.

11. The electronic device of claim 7, wherein the conversion time determining circuit decreases the conversion time duration as the voltage level of the power supply voltage increases, and increases the conversion time duration as the voltage level of the power supply voltage decreases.

12. The electronic device of claim 7, wherein the controller further includes:

a power supply voltage-conversion time lookup table which stores the conversion time duration corresponding to the voltage level of the power supply voltage, and wherein the conversion time determining circuit determines the conversion time duration corresponding to the voltage level of the power supply voltage using the power supply voltage-conversion time lookup table.

13. The electronic device of claim 7, wherein the power supply voltage control circuit decreases the voltage code provided to the power management circuit to decrease the voltage level of the power supply voltage in response to an alert signal from a rush current detection circuit.

14. The electronic device of claim 1, wherein the controller includes:

a global current management circuit which receives the digital current code from the current sensing circuit, determines a target current code corresponding to the panel load, and controls the panel current by comparing the digital current code and the target current code.

15. The electronic device of claim 1, wherein the controller includes:

an overcurrent protection circuit which receives the digital current code from the current sensing circuit, compares the digital current code with a reference overcurrent code, and controls the power management circuit to stop supplying the power supply voltage when the digital current code is higher than the reference overcurrent code.

16. A controller of a display device, the controller comprising:

a peak gray level determining circuit which determines a peak gray level by analyzing input image data;

a panel load determining circuit which determines a panel load for a display panel of the display device by analyzing the input image data;

a power supply voltage determining circuit which determines a voltage level of a power supply voltage supplied to a plurality of pixels of the display device based on the peak gray level and the panel load;

a conversion time determining circuit which determines a conversion time duration, during which a panel current is converted into a digital current code, based on the voltage level of the power supply voltage, and provides the conversion time duration to a current sensing circuit which senses the panel current; and a power supply voltage control circuit which provides a voltage code corresponding to the voltage level of the power supply voltage to a power management circuit.

17. The controller of claim 16, wherein the conversion time determining circuit decreases the conversion time duration as the voltage level of the power supply voltage increases, and increases the conversion time duration as the voltage level of the power supply voltage decreases.

18. The controller of claim 16, wherein the controller is implemented as a controller integrated circuit, wherein the current sensing circuit is included in a current sensing integrated circuit which is separated from the controller integrated circuit, and wherein the conversion time determining circuit provides the conversion time duration to the current sensing circuit through inter-integrated circuit communication between the controller integrated circuit and the current sensing integrated circuit.

19. The controller of claim 18, wherein the controller receives the digital current code from the current sensing circuit through the inter-integrated circuit communication, and wherein the controller further comprises:
- a global current management circuit which determines a target current code corresponding to the panel load, and controls the panel current by comparing the digital current code and the target current code; and
- an overcurrent protection circuit which compares the digital current code with a reference overcurrent code, and controls the power management circuit to stop supplying the power supply voltage when the digital current code is higher than the reference overcurrent code.

20. A current sensing integrated circuit of a display device, the current sensing integrated circuit comprising:
- a conversion time setting register which stores a conversion time duration;
- a current sensing circuit which converts a panel current of the display device into a digital current code during the conversion time duration; and
- a rush current detection circuit which generates an alert signal by comparing the digital current code with a rush current code corresponding to a rush reference current, wherein the conversion time duration of the conversion time setting register is set based on a voltage level of a power supply voltage supplied to a plurality of pixels of the display device.

* * * * *